INVENTORS
IRVING WHITEHOUSE
MARION E. GRAHAM
WILLIAM A. REED

BY Robert S. Dunham
ATTORNEY

INVENTORS
IRVING WHITEHOUSE
MARION E. GRAHAM
BY  WILLIAM A. REED

ATTORNEY

INVENTORS
IRVING WHITEHOUSE
MARION E. GRAHAM
WILLIAM A. REED
BY
Robert S. Dunham
ATTORNEY United States Patent Office 2,811,433
Patented Oct. 29, 1957

2,811,433

PROCESS OF TREATING IRON IN GAS-PERVIOUS FORM TO IMPROVE ITS CHARACTERISTICS

Irving Whitehouse, South Euclid, Marion E. Graham, Parma, and William A. Reed, West Richfield, Ohio, assignors to Republic Steel Corporation, Cleveland, Ohio, a corporation of New Jersey Application January 14, 1955, Serial No. 481,796

9 Claims. (Cl. 75—.5)

The present invention relates to a process of treating metallic iron in gas-pervious form to improve its characteristics, and more particularly for treating metallic iron, either in the form of iron powder such as is useful in the practice of powder metallurgy, or in the form of sponge iron, for improving certain of the characteristics affecting the utility of the these types of iron respectively. For example, when gas-pervious metallic iron is formed by the reduction of one or more of the oxides of iron by the use of a reducing gas, the oxygen is abstracted from the iron oxide, leaving a sponge type iron or spongy gas-pervious type particles thereof (if the initial material is separated into particles and these particles are not sintered together) which is believed to maintain an outer shape approximating that of the oxide particles from which it was formed and which is quite hard and relatively difficultly compressible to form a pressed article such as may thereafter be sintered to form a desired finished article. One of the characteristic tests for material useful in powder metallurgy, for example, is to determine the amount of pressure required to impart a predetermined bulk density to a body formed by this pressure (and without sintering) from powdered metal. For example, the amount of pressure required to form a body having a bulk density of 5¼ grams per cc. may be 50,000 lbs. per square inch (hereinafter abbreviated "p. s. i."). After treating the initial material (metal powder) in accordance with the present invention, the same bulk density may be attained by a pressure (sometimes termed "briquetting pressure") of substantially less than 50,000 p. s. i. Alternatively, the same pressure (for example, 50,000 p. s. i.) may be employed and a more dense body thereby formed. The characteristic of being compressible into a body of a given density by a relatively lower pressure is sometimes termed the "softness" of the starting material.

A further physical characteristic of metal powder useful in powder metallurgy is known as "shrinkage." By this is meant the amount by which a pressed piece will shrink in some linear dimension during the subsequent sintering thereof. It is usually expressed in terms of inches per inch, but might equally well be expressed as percent shrinkage (the latter value being the former times 100). It is also desired that the present invention shall not interfere substantially with or shall augment the percentage elongation under tension of the articles formed from material treated as hereinafter particularly taught.

Summarizing the present invention, it comprises starting with a material, which is either in the form of powder or sponge, and which is of the type usable for fabrication, for example, in accordance with powder metallurgy practices, i. e. it consists essentially of metallic iron in gas-pervious form. This material should have a hydrogen loss of not over about 1½%. By this is meant the percent weight loss from the material when heated in pure hydrogen at 2000° plus or minus 15° F. for one hour (a standard test in powder metallurgy).

The principal step of the present process is to expose or contact this starting material with a gas having as its essential active ingredient gaseous hydrogen chloride. The hydrogen chloride content of this gas may be at any value or range of values between about 0.1% and 100% (by volume). The temperature of treatment may be from about 1000° F. to about 2100° F. The time of treatment is usually at least about 10 minutes and may be up to about three hours or more. Within these broad ranges, the preferred temperature range is from about 1400° F. to about 1800° F. The preferred hydrogen chloride concentration is from about 1% to about 30% by volume; and the preferred time, about one to about two hours.

Considering first the background of the present invention, it has been found that when some iron oxide, as $Fe_2O_3$, $Fe_3O_4$, or probably also FeO, is subjected to a reducing action at a temperature high enough so that the reduction can proceed, oxygen is abstracted from the oxide by the reducing gas, which may for purposes of this discussion be hydrogen, leaving the metal (iron) in a spongy form in either large or small particles, but with very fine pores therein. This is shown, for example, in one of the accompanying drawings as hereinafter described. This material, by reason of the process by which it is formed, i. e. the abstraction of oxygen from the iron oxide, has been termed "subtractive" iron. This is the type iron which is made in the absence of a hydrogen halide in the reducing atmosphere. On the other hand, when a hydrogen halide is present in the reducing atmosphere in a concentration adequate under all circumstances, an essentially different type of iron is formed which may be termed "additive" iron. This novel type of iron is described in considerable detail in the copending application of Crowley Serial No. 375,927, filed August 24, 1953, and entitled "Process of Making Powdered Iron in a Discrete Crystalline Form." Very briefly, the theory which is presently believed to be correct, but which is not relied upon in support of the patentability of any claims in this or in the Crowley application aforesaid, is that the gaseous hydrogen chloride present during the reduction reacts at least instantaneously with some iron, forming ferrous chloride. This ferrous chloride is in gaseous form at the temperature at which the materials are held, as it has a sufficient vapor pressure at this temperature so that in view of the relatively slight amount of it present at any one time, it has a sufficient partial pressure along with the partial pressures of the other gases present to exist in this gaseous form. It is believed then that this gaseous ferrous chloride reacts in the gaseous phase with some hydrogen present in the gases, so as to regenerate the iron in metallic form and to regenerate hydrogen chloride in gaseous form, the iron so regenerated being deposited on any metallic iron present and thus progressively building up crystals of metallic iron by a process similar to the growth of crystals in a solution. The longer the time afforded and, within certain limits, the higher the temperature or the higher the HCl concentration or both, the more the crystals grow.

These crystals develop in some instances in a form which may termed "dendritic" and in some cases resembles the manner in which a cactus plant grows, i. e. each body or particle apparently adhering in a hit or miss manner to the next small particle and so on in one or more straight or branched chains. This type formation may be seen by inspection through a sufficiently high powered microscope, preferably of a stereoscopic type, so as to give the viewer a three-dimensional view of the crystals. Because the crystals are built up rather than constituting an iron body formed by subtraction of something, this type of iron has been termed "additive" iron.

It has been found that additive iron in general is substantially softer, as hereinabove defined, than is subtractive iron and, further, that it is characterized by relatively low shrinkage as above defined, substantial elongation, and in general has physical characteristics better suited to the practice of powder metallurgy than purely subtractive iron.

While iron material consisting of or containing a substantial amount of additive iron may be produced by the process taught in the Crowley application, the present application seeks to attain certain of the results of the process of the Crowley application by the treatment of more conventional subtractive iron by a special process, sometimes termed "after treatment" and sometimes "reformation." The raw material supplied to the present process is material which consists of or comprises principally the more conventional subtractive type iron, i. e. either iron powder or sponge which may be made by any of the processes known to the prior art (earlier than the Crowley case aforesaid) and which may be improved substantially in its properties by being treated as hereinafter particularly set forth. The best test which has been found to identify desired results in accordance with the present invention as compared with prior art materials is to determine the amount of pressure (briquetting pressure) required to produce a body of a given density. As a practical matter, once the material produced in accordance with the present invention is made by carrying out the present process, it may well be that the art will desire to employ at least as great pressure as was conventional in the prior art and thereby will make a final product superior to that which could be made using untreated prior art materials and with the same pressure.

The process may be better appreciated by reference to the accompanying drawings, comprising a group of microphotographs of iron powder, each made at 500X magnification, and each made with the same starting material. As shown in the drawings.

Figure 1:
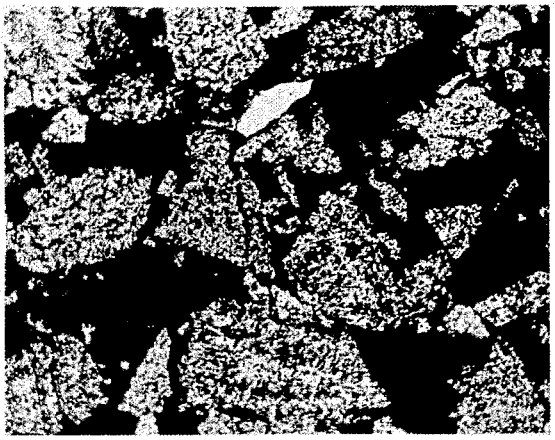
Figure 1 is a view of the starting material, i. e. iron powder which was reduced at 1100° F. in the absence of hydrogen chloride during the reduction.
Figure 2:
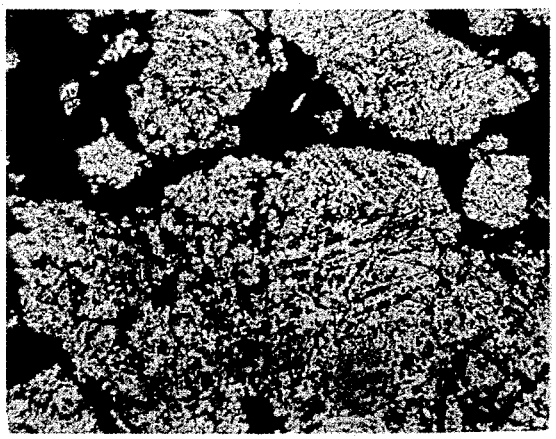
Fig. 2 is a similar view illustrating the low temperature limit of the process, i. e. wherein the starting material was contacted at 1000° F. with a gas consisting of 1% hydrogen chloride and the balance hydrogen.
Figure 3:
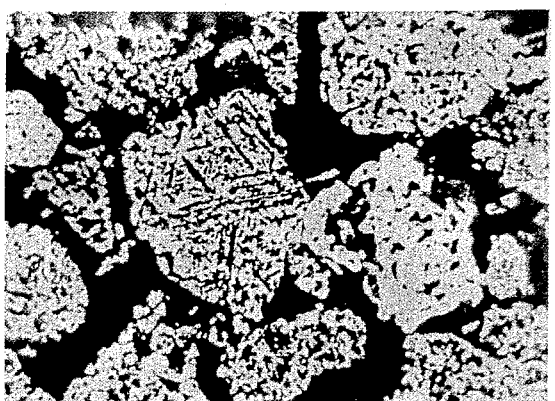
Figure 4:
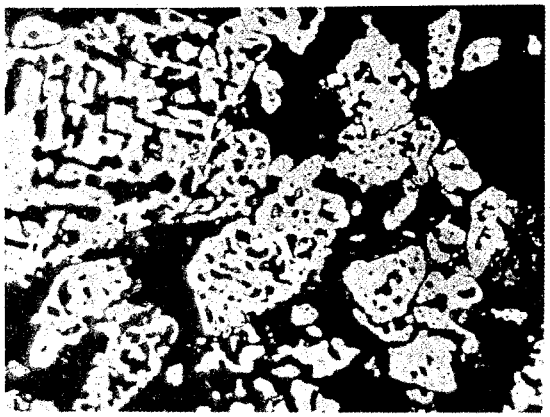
Figure 5:
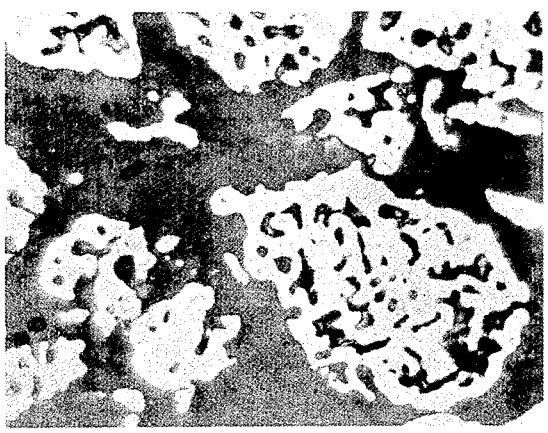
Figure 6:
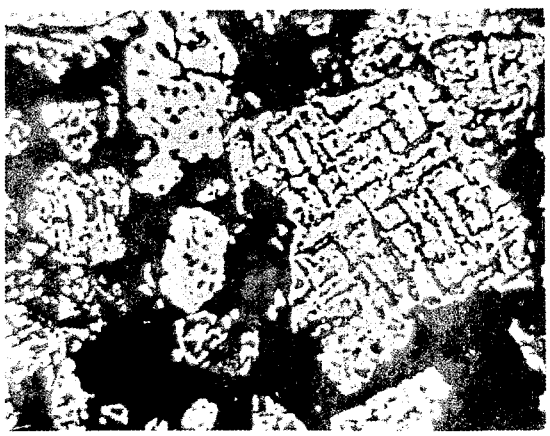
Figure 7:
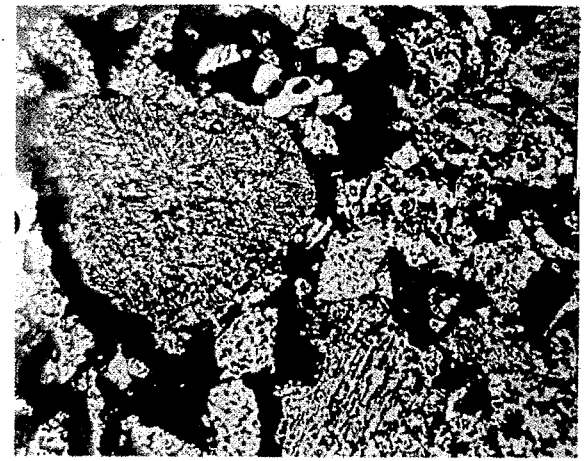
Figure 8:
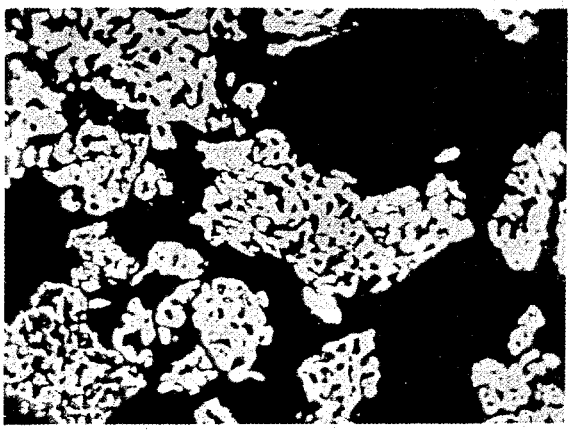
Figure 9:
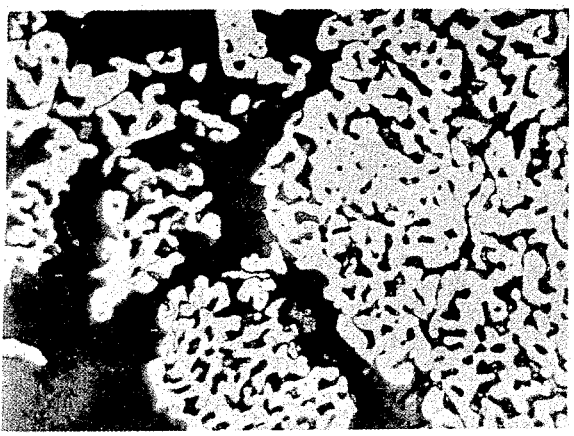

Figs. 3, 4, 5, 6 and 7 are views under different conditions as hereinafter set forth, all at 1600° F. (in the middle of the preferred temperature range), Fig. 3 showing the results of exposing the material for 15 minutes to a gas containing 10% hydrogen chloride, Fig. 4 is the same material exposed for one hour to the same gas, Fig. 5 is the same material exposed for one hour to a gas containing 30% HCl, Fig. 6 is the same material exposed for 10 minutes only to a gas consisting of 100% HCl, and Fig. 7, the same material exposed for one hour to gas containing 1% HCl; and Figs. 8 and 9 are views showing material treated at 2100° F., the high limit of temperature in accordance with the present invention, with gases containing 0.1% hydrogen chloride (Fig. 8) and 1% hydrogen chloride (Fig. 9), the exposures being for one hour in each instance.

The starting material for the present process has been set forth in detail hereinabove, this material being briefly one consisting essentially of metallic iron in a gas-pervious form, i. e. either in the form of iron powder of a type usable for powder metallurgy operations or in the form of sponge iron. The starting material should have a hydrogen loss, as hereinabove defined, of not over about 1½%. This limitation is put in so as to distinguish between the present intended starting material, on the one hand, and mixtures of metallic iron with substantial amounts of iron oxide on the other. The treatment of various such mixtures is included in the Crowley et al. application hereinabove referred to. The reason for choosing the 1½% hydrogen loss as a limitation in this case is that this is in accordance with conventional limits acceptable as powdered metal in the powder metallurgy industry, any iron powder having a greater hydrogen loss than about 1½% being usually unacceptable to manufacturers of parts by powder metallurgy processes.

The starting material in the present case is stated to "consist essentially" of metallic iron. By this, the starting material is intended to include material which is not only principally iron, but which may include amounts of such impurities as may be present in commercial iron powder and be acceptable to users of such powder for powder metallurgy purposes. One large user of this kind puts the following limits on these impurities as tolerable amounts (these limits being given by way of example and not as an absolute mathematical limitation):

| | Percent maximum |
|---|---|
| Total carbon | 0.20 |
| Total manganese | 0.90 |
| Total silicon | 0.30 |
| Insolubles, other than $SiO_2$ and C | 0.50 |
| Hydrogen loss (as above) | 1.50 |

The first and principal step of the process is to expose the starting material, while at a temperature in the desired range, to a gas containing some hydrogen chloride. In order that the essential features of this step shall be clearly set out, the first point herein considered is the hydrogen chloride content of this gas.

It has been found that even quite small amounts of hydrogen chloride are effective to get appreciable results, particularly at the higher end of the temperature range hereinafter set forth. Thus from a practical point of view and in order to put a definite mathematical limit on the process, the minimum HCl concentration in the treating gas may be taken for the purposes of this application to be 0.1% by volume. Substantially lower concentrations will not obtain or give appreciable results and hence are not to be considered within the purview of the present invention. On the other hand, there is no upper limit to the hydrogen chloride concentration in the gases other than 100% hydrogen chloride, as gases up to and including this high concentration have been successfully tried.

There is no other one essential ingredient in the gas. When the hydrogen chloride concentration is less than 100%, the remainder of the gas, to which the starting material is exposed, may be any one or more gases, with the limitation, however, that the gas shall be non-oxidizing in its over-all character, i. e. there is a negligible amount of oxygen or oxidizing gases therein. Within this limitation the gas as a whole may be either substantially neutral or reducing in character. A preferred composition, for example, is that in which a substantial amount or all of the balance of gas (the difference between the hydrogen chloride concentration and 100%) shall be hydrogen. This gives a preferred type of operation as hereinafter more particularly discussed.

The next essential feature of the process is temperature. The outside limits of temperature are from about 1000° F. to about 2100° F. The low limit of 1000° F. is chosen because this is just about the lowest temperature at which any substantial or appreciable results can be obtained with any selected concentration of HCl. Furthermore, as the low limit is approached, it is found that the HCl has an increasing tendency to convert the iron present to ferrous chloride, rather than to carry on the process desired in accordance with the present invention, even when the gas to which the starting material is exposed consists of hyrogen in addition to the hydrogen chloride present. Thus, for example, concentrations of HCl in the gas above about 1%, even with the balance hydrogen, will give increasingly poor results as the temperature is reduced to about 1000° F.

The upper limit of 2100° F. is chosen because as this temperature limit is approached or exceeded, the degree of sintering the gas-pervious iron, of which the starting material is constituted as aforesaid, is too great, wholly apart from the effect of the treatment of the starting material with the hydrogen chloride-containing gas. Thus it is desired to operate at temperatures not over about 2100° F. so as to minimize this sintering. The preferred temperature range is from about 1400° F. to about 1800° F. for the same or similar reasons and so as to obtain the maximum desirable results from the process without danger of introducing some of the undesirable results which particularly dictate the outside limits as aforesaid.

The next feature to be considered is that of time. In most instances it is found that a time period from about one to two hours is usually preferred. On the other hand, with quite high temperatures or quite high hydrogen chloride concentrations or both, somewhat lower time periods may be particularly desirable, for example, periods as low as about 10 minutes. For similar reasons, with relatively low temperatures and/or relatively low hydrogen chloride concentrations, somewhat longer time periods may be used, the maximum being dictated by economic considerations, rather than by process considerations. As a practical matter it is believed that times more than about three hours will be economically impracticable and hence are not to be considered within the purview of the present invention.

In general, it is found, as to the interrelation between the several factors above discussed, that lower HCl concentrations may be employed at relatively higher temperatures or higher concentrations at lower temperatures to achieve comparable results. The effect of temperature and concentration on the one hand versus time on the other has been discussed above.

It will be largely obvious from a consideration of the drawings hereinabove generally described that the effect of the process from an appearance point of view is the coarsening of the porous structure of the starting material, so that instead of a very large number of small pores with relatively thin webs therebetween, there is in the product of the present process a smaller number of larger pores with thicker webs therebetween. It will also be obvious from these photomicrographs that the results obtainable at quite low temperatures, i. e. at about 1000° show very little difference from the starting material, indicating that the degree of change effected at these low temperatures is substantially a minimum. In some instances, even where a microphotograph will not show any appreciable change, the actual change may be measured more quantitatively, so as to indicate a positive change effected by the process, by pressing a sample of the treated material and comparing the pressure required to obtain a given density with the pressure require to obtain the same density using the untreated material. This test is believed to be the most accurate one available and hence is employed in the appended claims as defining the change effected by the process.

While the process may be carried on as above set forth as in effect a single step process, in its preferred form, this step is but the first of a two-step process, the second step of which is a clean-up operation in which the material resulting from the first step, and which may have some iron chloride, as ferrous chloride, therein, incident to the treatment aforesaid, is exposed to a gas containing a substantial proportion of hydrogen as its essential active ingredient. This gas is preferably substantially free of HCl. The chemical result effected in this second or clean-up step is to convert any iron chloride present to metallic iron and hydrogen chloride. This clean-up operation is preferably carried on at about the same temperature or temperature range as the first step of the process and for a period of about one-half hour. In some cases, particularly when very high concentrations of hydrogen chloride are used or long times are used in the first step, a longer clean-up operation may be useful, such as for example as about one hour.

It will be understood that the gas used in either the first step of the process or the second step may contain substantial amounts, or even in some instances, major proportions of one or more inert gases, such as nitrogen. These gases do not affect what is being carried on as aforesaid, but may affect the rate at which it takes place.

The present process may be carried on in any desired type apparatus useful for gas-to-solid chemical reactions including, for example, rotary kilns, multiple hearth furnaces, belt type furnaces and others which will occur to those skilled in the art from the foregoing description. Such operations may also include apparatus in which the solid material is not agitated during the treatment and may include intermittent or batch operations as well as continuous operations. These different types of equipment are all well known to chemical engineers and metallurgists skilled in this art and need not be illustrated at this time.

The process has been tested as set forth in the following examples. In each of these examples the same raw material was used, this raw material being formed as an iron powder made by reducing an iron oxide with pure hydrogen at 1100° F. and in the absence of any hydrogen halide. This powder as supplied to the present process and as used in the tests hereinafter set out was found to have the following physical properties:

Density when pressed at 50,000 p. s. i.=5.25 grams per cc.
Tensile strength (after sintering)=22,000 p. s. i. (when pressed at 50,000 p. s. i.)
Shrinkage (during sintering)=0.037 inches per inch (on parts pressed at 50,000 p. s. i.)

*Example I*

The powder described above was heated in nitrogen to 1600° F., then treated with a mixture of 10% HCl and 90% hydrogen at 1600° F. for one hour and then subjected to a clean-up treatment with pure hydrogen for one-half hour at the same temperature. This powder has the following physical properties (all of the properties given referred to pieces pressed at 50,000 p. s. i. and all on the same basis as given above for the starting material):

Density=6.0 grams per cc.
Tensile strength=25,000 p. s. i.
Shrinkage=0.0067 inches per inch

*Example II*

The same basic powder was treated in the same manner as Example I except that the HCl treatment lasted for only 15 minutes, rather than for one hour. The product had the following characteristics comparable respectively with those given above:

Density=5.76 grams per cc.
Tensile strength=24,000 p. s. i.
Shrinkage=0.017 inches per inch

*Example III*

The same basic powder was heated to 1600° F. in nitrogen, then treated for one hour with a mixture containing 70% hydrogen and 30% HCl at 1600° F. and then was given a clean-up reduction period with pure hydrogen (absent HCl) for one additional hour. The resulting powder had the following physical properties:

Density=6.16 grams per cc.
Tensile strength=23,000 p. s. i.
Shrinkage=0.0042 inches per inch

Example IV

The same basic powder was heated to 1600° F. in nitrogen and then treated with pure HCl for ten minutes at 1600° F. Following this there was a clean-up period of one hour in pure hydrogen. The resulting powder had the following physical properties:

Density=5.82 grams per cc.
Tensile strength=24,000 p. s. i.
Shrinkage=0.018 inches per inch

Example V

The same basic powder was heated in nitrogen at 1000° F. and then treated with a mixture of 1% HCl and 99% hydrogen for one hour at 1000° F. The powder was then subjected to pure hydrogen for one additional hour at 1000° F. The powder had the following physical properties:

Density=5.27 grams per cc.
Tensile strength=21,000 p. s. i.
Shrinkage=0.030 inches per inch This is considered to be about the smallest degree of improvement that should be included within the invention.

Example VI

As an example of the upper limit of temperature that can be employed, the same basic powder was heated in nitrogen to 2100° F. and then treated with a mixture of 1% HCl and 99% hydrogen for one hour. Following this there was an additional one-half hour clean-up period using pure hydrogen. The resulting powder had the following physical properties:

Density=5.94 grams per cc.
Tensile strength=21,500 p. s. i.
Shrinkage=0.005 inches per inch

Example VII

The same basic powder was given the same treatment as that described in the previous example except the concentration of HCl used was only 0.1% by volume. This powder had the following physical properties:

Density=5.88 grams per cc.
Tensile strength=22,000 p. s. i.
Shrinkage=0.009 inches per inch

Example VIII

The same basic powder was given a similar treatment, in this case for one hour, at a treating temperature of 1600° F. and with a gas having a concentration of HCl therein of 1% by volume. The treated powder, when tested as aforesaid, was found to have the following properties:

Density=5.6 grams per cc.
Tensile strength=22,500 p. s. i.
Shrinkage=0.013 inches per inch The powder of this example is shown in Fig. 7.

While there has been illustrated and described herein a certain limited number of actual tests and the principles of the present invention as well as its practical limits have been set forth, other equivalents will occur to those skilled in the art from the foregoing description. It is intended that the scope of the invention shall be determined by the appended claims which are to be construed validly as broadly as the state of the art permits.

What is claimed is:

1. The process of treating a starting material consisting essentially of metallic iron all of which is in gas-pervious form resulting from the chemical reduction of at least one reduceable chemical compound of iron other than the halides of iron by a gaseous reducing agent, while maintaining the iron produced below its melting point and without the application of any substantial mechanical force tending to compact the reduced iron so produced, said metallic iron having a hydrogen loss of not over about 1½%, said process comprising the steps of contacting said starting material, while at a temperature in the range of about 1000° F. to about 2100° F., with a non-oxidizing gas containing as its essential active ingredient gaseous hydrogen chloride in a volume concentration of at least about 0.1%, and maintaining said starting material, while in said temperature range, in contact with said gas for a time period sufficient to change said starting material to one which is compressible to a body having a predetermined bulk density with a pressure substantially less than that required to obtain the same bulk density with the same starting material prior to the treatment aforesaid.

2. The process in accordance with claim 1, in which the metallic iron constituting said starting material is powdered iron of a type useful in powder metallurgy.

3. The process in accordance with claim 1, in which the metallic iron constituting said starting material is a mass of sponge iron.

4. The process in accordance with claim 1, in which said non-oxidizing gas is one containing a substantial amount of hydrogen in addition to its content of gaseous hydrogen chloride as aforesaid.

5. The process in accordance with claim 1, in which the temperature at which the treatment aforesaid takes place is in the range of about 1400° F. to about 1800° F.

6. The process of treating a starting material consisting essentially of metallic iron all of which is in gas-pervious form resulting from the chemical reduction of at least one reduceable chemical compound of iron other than the halides of iron by a gaseous reducing agent, while maintaining the iron produced below its melting point and without the application of any substantial mechanical force tending to compact the reduced iron so produced, said metallic iron having a hydrogen loss of not over about 1½%, said process comprising the steps of contacting said starting material, while at a temperature in the range of about 1000° F. to about 2100° F., with a non-oxidizing gas containing as its essential active ingredient gaseous hydrogen chloride in a volume concentration of at least about 0.1%, and maintaining said starting material, while in said temperature range, in contact with said gas for a time period sufficient to change said starting material to one which is compressible to a predetermined bulk density with a pressure substantially less than that required to obtain the same bulk density with the same starting material prior to the treatment aforesaid, and thereafter and as a second step of the process, effected with the material held in the same temperature range, contacting said material with a gas containing a substantial amount of hydrogen and which is substantially free of gaseous hydrogen chloride, so as to reduce any iron chloride present in the material to metallic iron by reaction with the hydrogen in the gas.

7. The process in accordance with claim 6, in which the material is maintained within the temperature range of about 1400° F. to about 1800° F.

8. The process in accordance with claim 6, in which said non-oxidizing gas has a gaseous hydrogen chloride content (by volume) of about 1% to about 30%, and in which the balance of said non-oxidizing gas contains a substantial amount of hydrogen.

9. The process in accordance with claim 6, in which the material is maintained within the temperature range of about 1400° F. to about 1800° F.; in which said non-oxidizing gas has a gaseous hydrogen chloride content (by volume) of about 1% to about 30%, and the balance of said non-oxidizing gas contains a substantial amount of hydrogen; in which the time period during which the solid material is exposed to the hydrogen chloride-containing gas is from about 10 minutes to about 3 hours; and in which the subsequent time period during which the material is brought into contact with a gas containing hydrogen and free from gaseous hydrogen chloride for the conversion of iron chloride to metallic iron is about one-half hour.

References Cited in the file of this patent

UNITED STATES PATENTS

| | | |
|---|---|---|
| 2,199,418 | Redmond et al. | May 7, 1940 |
| 2,660,569 | Reitlinger | Nov. 24, 1953 |
| 2,675,310 | Hall | Apr. 13, 1954 |
| 2,679,466 | Spendelon et al. | May 25, 1954 |
| 2,744,002 | Crowley | May 1, 1956 |
| 2,766,117 | Crowley et al. | Oct. 9, 1956 |

FOREIGN PATENTS

| | | |
|---|---|---|
| 598,181 | Great Britain | Feb. 12, 1948 |
| 668,544 | Great Britain | Mar. 19, 1952 |
| 137,248 | Australia | May 15, 1950 |
| 946,462 | France | June 3, 1949 |